Dec. 12, 1939.    S. M. ANDERSON    2,183,498
VENTILATING APPARATUS
Filed Dec. 8, 1938    3 Sheets-Sheet 1
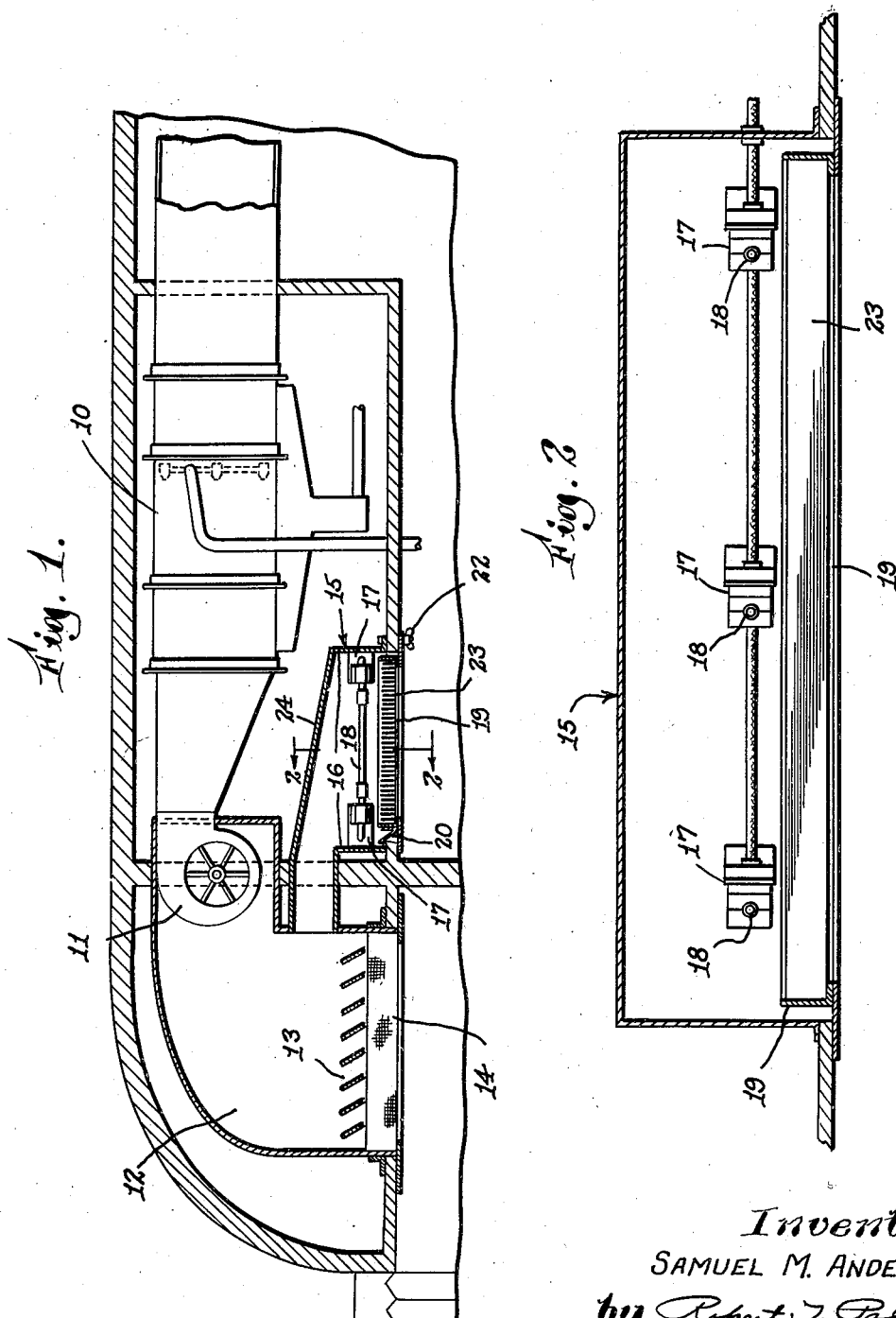
Inventor
SAMUEL M. ANDERSON
by Robert J. Palmer
Attorney Dec. 12, 1939.　　　　S. M. ANDERSON　　　　2,183,498
VENTILATING APPARATUS
Filed Dec. 8, 1938　　　3 Sheets-Sheet 2

Inventor
SAMUEL M. ANDERSON
by Robert T. Palmer
Attorney

Dec. 12, 1939.  S. M. ANDERSON  2,183,498
VENTILATING APPARATUS
Filed Dec. 8, 1938  3 Sheets-Sheet 3
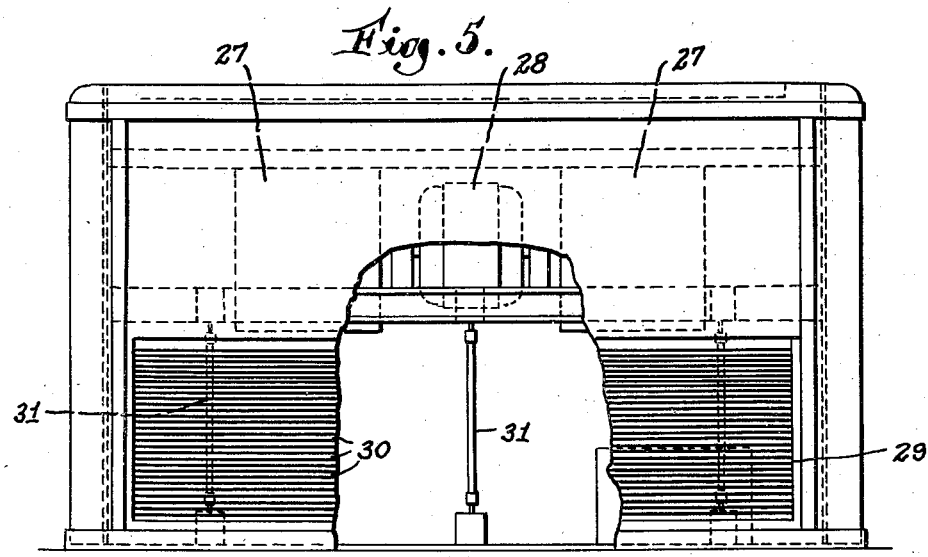
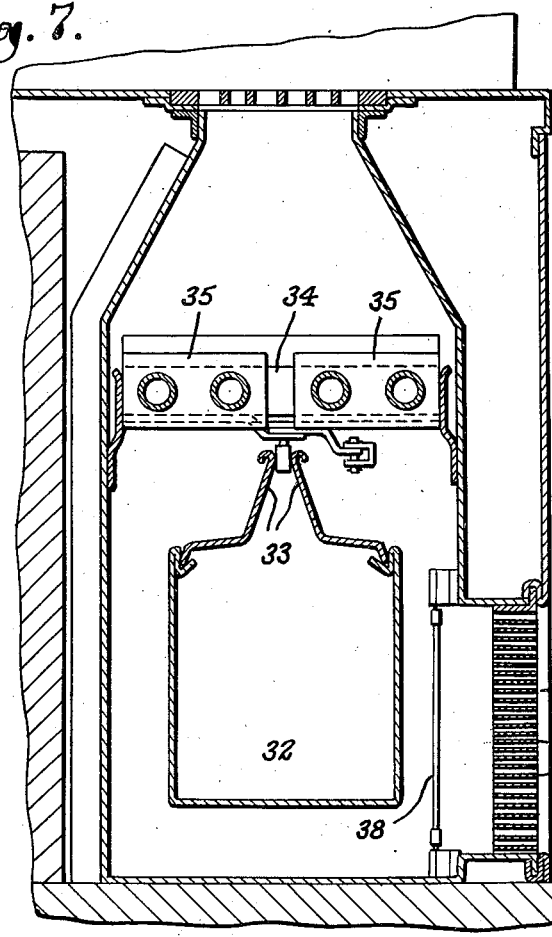
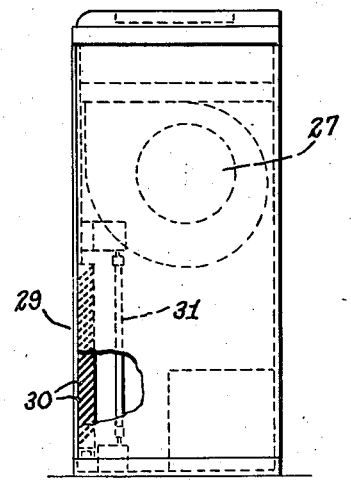
Inventor
SAMUEL M. ANDERSON
by Robert J. Palmer
Attorney Patented Dec. 12, 1939

2,183,498

UNITED STATES PATENT OFFICE 2,183,498

VENTILATING APPARATUS

Samuel M. Anderson, Sharon, Mass., assignor to B. F. Sturtevant Company, Boston, Mass.

Application December 8, 1938, Serial No. 244,651

2 Claims. (Cl. 250—43)

This invention relates to the conditioning of air for human comfort and relates more particularly to the sterilization of air through irradiation by ultra-violet light.

This application is a continuation-in-part of my copending applications, Serial No. 153,503 filed July 14, 1937, and Serial No. 177,831 filed Dec. 2, 1937.

While it has been known for many years as shown, for example, by the British Patent No. 8,300 of 1909, that ultra-violet light may be used for sterilizing air, many competent medical authorities and many engineering authorities experienced in the design manufacture and use of ultra-violet lamps, have denied that ultra-violet irradiation could be effectively used in air conditioning. They have stated that while ultra-violet light was effective for destroying bacteria upon meat and that it might be effective for destroying bacteria in absolutely motionless air, it could not be used effectively in air conditioning where the air moves at relatively high velocity.

I have however, equipped a number of railway passenger cars in the United States and Canada with air conditioning apparatus utilizing ultra-violet irradiation for sterilization of the recirculated air, and exhaustive and conclusive tests conducted by competent medical and bacteriological authorities have demonstrated that my apparatus is effective in destroying the bacteria carried by the air. I accomplish this as my invention by providing a recirculated air inlet grille with a plurality of parallel, closely spaced, partitions and by placing one or more ultra-violet lamps on the back side with respect to air flow, of the grille, in such a position that the light rays pass between the partitions into the space from which the recirculated air is drawn. The rays thus irradiate the air before it enters the grille, as it passes through the grille, as it passes the lamp or lamps, and after it leaves the lamps. The partitions are so closely spaced that they offer considerable resistance to the air flow and act as orifices or weirs to dam up the air flowing into the grille. The result is that the recirculated air approaches the grille at a very low velocity, the velocity through the grille increasing to a relatively high velocity. The ultra-violet light shining between the partitions therefore irradiates the relatively stagnant air which probably is the reason my invention has proven so effective.

In a preferred embodiment of the invention, the closely spaced parallel portions of the grille have aluminum surfaces, or other surfaces which efficiently reflect ultra-violet light; a plurality of tubular ultra-violet lamps are mounted with axes parallel and at right angles to the planes of the partitions, and the grille is mounted in an inlet box having walls of aluminum or other material which efficiently reflects ultra-violet light.

An object of the invention is to sterilize ventilating air.

Another object of the invention is to sterilize air in an air conditioner.

Another object of the invention is to improve the performance of ultra-violet lamps in sterilizing recirculated air.

Other objects of the invention will be understood from the following description and from the drawings.

The invention will now be explained with reference to the drawings, of which:

Fig. 1 is a profile view in section of one embodiment of the invention applied to a railway passenger car.

Fig. 2 is a sectional view along the lines 2—2 of Fig. 1;

Fig. 5 is an elevation view with a portion broken away of a unit ventilator including the invention;

Fig. 6 is an end view with a portion broken away of the unit ventilator of Fig. 5, and Fig. 7 is an end view in section of an air blender unit including the invention.

Figure 3:
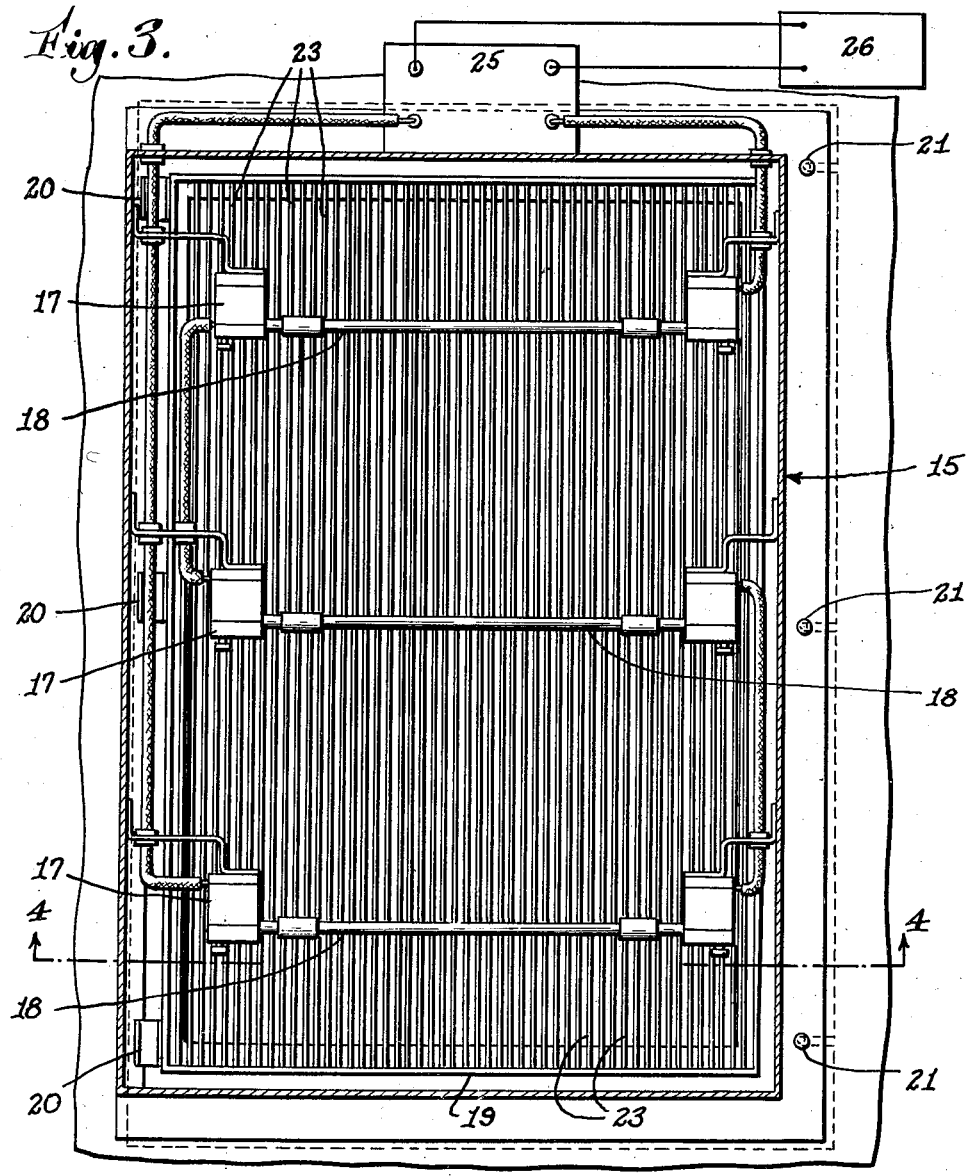
Fig. 3 is a plan view looking downwardly upon the recirculated air inlet box of Figs. 1 and 2.

Referring first to Fig. 1, there is shown a railway passenger car having a conventional air conditioner 10, blower 11, and the fresh air passage 12 with its dampers 13 and filter 14.

The recirculated air inlet box 15 embodying this invention, includes the vertical reflecting walls 16 to which are attached the brackets 17 which support the tubular mercury vapor lamps 18. The recirculated air grille 19 is attached to the lower ends of the walls 15 by the flanges 20 and by the screws 21. The grille 19 may be readily removed from the inlet box by removal of the wing nuts 22 from the screws 21, for providing access to the lamps 18.

The grille 19 includes the relatively closely spaced partitions 23 which perform the three functions:

1. They act as orifices or weirs to substantially slow down the air drawn by the blower 11 towards the grille 19.
2. They have surfaces which efficiently reflect ultra-violet light so that the air passing between them is subjected to multiple reflection of the rays from the lamps 18.

3. They prevent the lamps from being seen except when one stands directly under the grille and looks directly upward, thus reducing greatly the risk of injury to the eyes by the strong direct rays from the lamps.

The upper wall 24 of the inlet box 15 is also of aluminum or other material which efficiently reflects ultra-violet light and the recirculated air after entering the grille 19 is irradiated by direct rays from the lamps 18 and by reflected rays from the walls 15 and 16. I have determined however, that the rays shining between the partitions 23 and into the exterior space below them, are more effective in destroying bacteria carried by the air than the direct rays and reflected rays acting after the air has entered the grille 19. I attribute this to the fact that due to the location of the grille and its partitions 23, the air before it enters the grille is greatly slowed down so that the light shining through the partitions 23 acts upon air having very low velocity and due to this and to the fact that the light projects between the partitions 23, a considerable distance into the car, each bacteria particle is subjected to prolonged irradiation as it moves slowly through a relatively long path to the grille 19.

Figure 4:
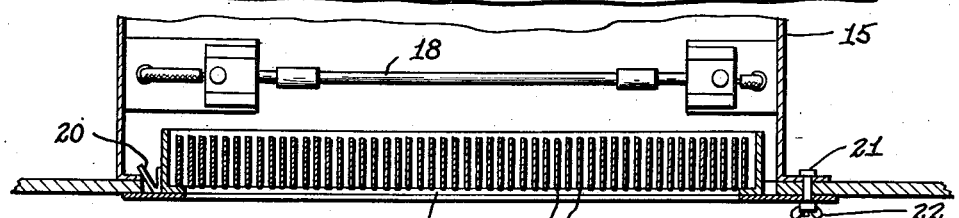
Fig. 4 is a sectional view along the lines 4—4 of Fig. 3.

As shown most clearly by Figs. 3 and 4, the lamps 18 are arranged with their axes substantially perpendicular to the planes of the parallel partitions 23. This is the preferred arrangement since the rays from each lamp extend directly between all partitions directly below them.

As shown by Fig. 3, the lamps are connected in series to the rotary converter 25 which is energized from the car electric source 26.

Figs. 5 and 6 illustrate the application of the invention to what are known as unit ventilators and which include the blowers 27 driven by the motor 28, for circulating air and which may include heat exchangers and air cleaners (not shown). The recirculated air grille 29 contains the relatively closely spaced partitions 30 which correspond to the partitions 23 of Figs. 1-4, and to the rear with respect to air flow of the grille 29, are mounted the ultra-violet lamps 3.

Fig. 7 illustrates the application of the invention to air blender units. Such units are supplied with conditioned fresh air from a central source. The fresh air is supplied through the passage 32 under pressure and passes through the nozzle 33 and through the opening 34 between the heat exchangers 35, to induce the flow of recirculated air through the grille 36. The grille 36 contains the closely spaced partitions 37 which correspond to the partitions 23 of Figs. 1-4 and the ultra-violet lamps 38 project light between the partitions 37 to irradiate the air entering the grille 36.

In the embodiment of Figs. 1-4, of Figs. 5 and 6, and of Fig. 7, the closely spaced partitions in the recirculated air grilles act to slow down the air entering the grilles, to reflect light from the lamps, and to guide the light from the lamps to considerable distances to the exterior of the grilles while preventing the light source from being seen. In each embodiment, the partitions are so many and so closely spaced that they form constricted air passages.

While several embodiments of the invention have been described for the purpose of illustration, it should be understood that other apparatus and arrangements of apparatus could be suggested by those skilled in the art without departure from the essence of the invention.

What is claimed is:

1. Ventilating apparatus comprising air moving means, an air inlet grille, an ultra-violet lamp between said means and said grille and arranged relatively close to and in alignment with said grille, and means comprising a plurality of parallel, closely spaced partitions in said grille having lengths several times the distance between adjacent partitions, forming a plurality of relatively narrow and relatively long constricted orifices for providing substantial resistance to the air moved by said air moving means through said grille, said partitions having surfaces which efficiently reflect the ultra-violet light from said lamp.

2. Ventilating apparatus comprising air moving means, an air inlet grille, ultra-violet lamps between said means and said grille, and means comprising a plurality of parallel, closely spaced partitions in said grille having lengths several times the distance between adjacent partitions, forming a plurality of relatively narrow and relatively long constricted orifices for providing substantial resistance to the air moved by said air moving means through said grille, said partitions having surfaces which efficiently reflect the ultra-violet light from said lamps, said lamps being arranged relatively close to and in alignment with said grille but with their axes at right angles to the planes of said partitions.

SAMUEL M. ANDERSON.